May 24, 1960 W. W. MAYS 2,937,466
LIVE FISH BAIT GUARD
Filed June 19, 1958
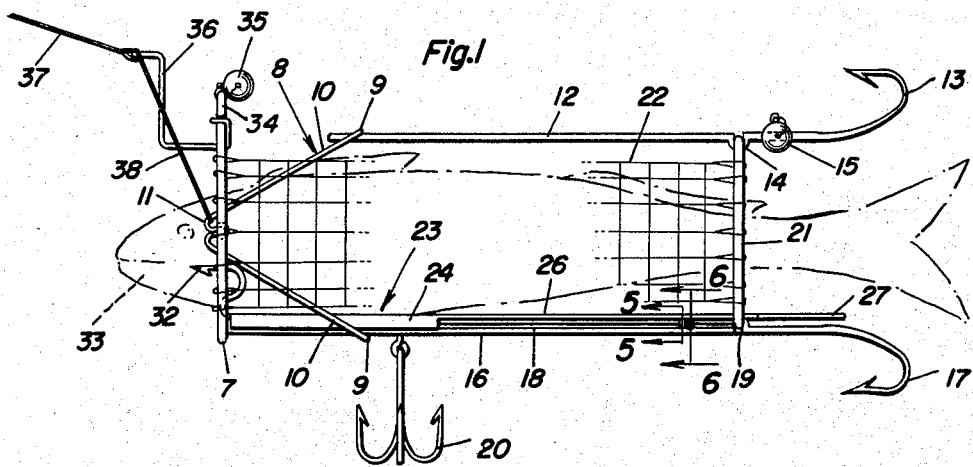
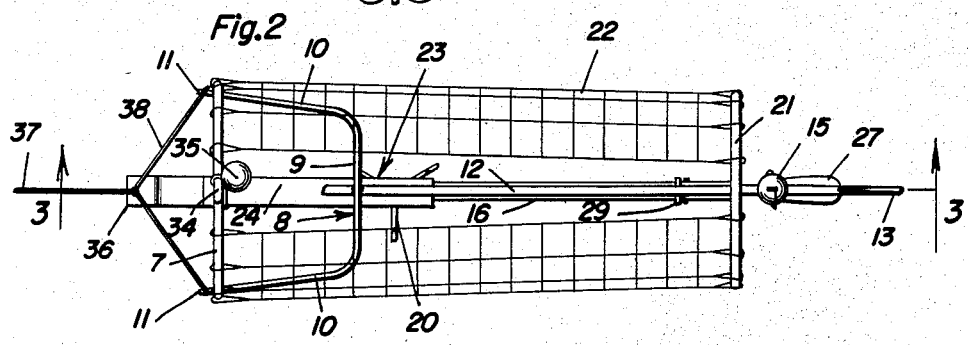
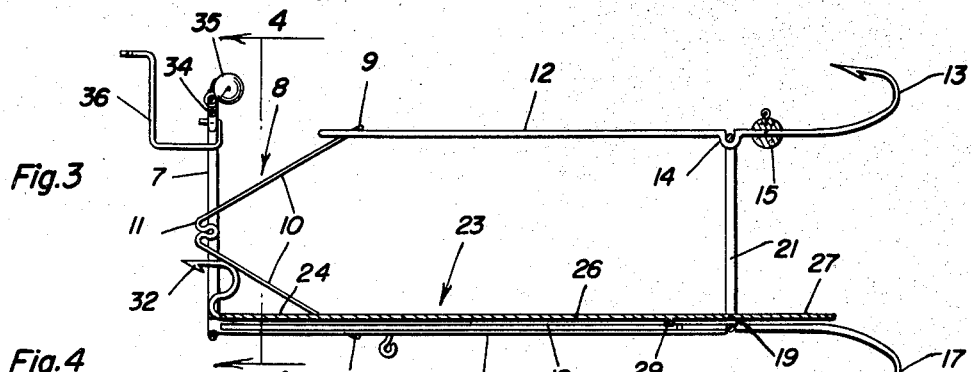
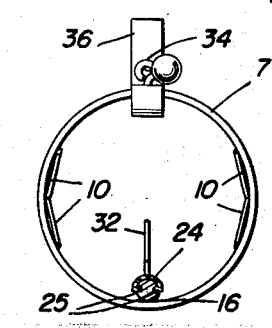
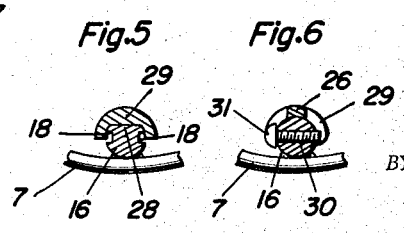
Wilburt W. Mays
INVENTOR.

United States Patent Office 2,937,466
Patented May 24, 1960

2,937,466

LIVE FISH BAIT GUARD

Wilburt W. Mays, 2020 N. 8th St., Philadelphia, Pa.

Filed June 19, 1958, Ser. No. 743,158

4 Claims. (Cl. 43—41)

This invention relates to new and useful improvements in guards or protectors for live fish bait, particularly minnows or the like, and has for one of its important objects to provide, in a manner as hereinafter set forth, novel means for preventing the minnow from being swallowed or injured by the fish which it lures.

Another very important object of the present invention is to provide a live bait guard of the aforementioned character which will securely hold the minnow but in a manner to permit freedom of movement to swim about and without serious injury, thus materially prolonging its life and usefulness.

Other objects of the invention are to provide a live fish bait guard or protector of the character described which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of a live fish bait guard or protector constructed in accordance with the present invention;

Figure 2 is a top plan view thereof;

Figure 3 is a view in vertical longitudinal section through the device with the flexible foraminous tube omitted, taken substantially on the line 3—3 of Figure 2;

Figure 4 is a view in transverse section, taken substantially on the line 4—4 of Figure 3;

Figure 5 is an enlarged detail view in transverse section, taken substantially on the line 5—5 of Figure 1; and Figure 6 is an enlarged detail view in transverse section, taken substantially on the line 6—6 of Figure 1.

Referring now to the drawing in detail, it will be seen that the embodiment of the invention which has been illustrated comprises a stationary front ring 7 of suitable metal. Mounted on the ring 7 and extending rearwardly therefrom is a substantially V-shaped spring 8 of suitable resilient wire. The spring 8 comprises substantially U-shaped wings 9 the legs 10 of which are joined as at 11 and fixed to the ring 7 on diametrically opposite sides thereof.

Affixed as by spot welding to the bight portion of one of the wings 10 and extending rearwardly therefrom is the elongated, resilient shank 12 of a fish hook 13. The rear portion of the shank 12 is formed to provide a loop or notch 14 the purpose of which will be presently set forth. Secured on the shank 12, rearwardly of and adjacent to the notch 14 is a float 15.

Affixed as by spot welding to the bight portion of the lower wing 10 of the spring 8 and in the lower portion of the ring 7 is the enlarged, rearwardly extending shank 16 of a hook 17. The shank 16 has formed longitudinally in its sides grooves or channels 18. The grooves 18 are closed at their forward ends. The rear ends of the grooves 18 are open and immediately adjacent thereto the shank 16 is reduced and formed to provide a notch 19 which communicates with said grooves. A treble hook 20 depends from the shank 16.

Slidably mounted on the shanks 12 and 16 and engageable in the notches 14 and 19 is a metallic ring 21. Reference numeral 22 designates a foraminous tube of suitable flexible material having one end connected to the stationary front ring 7 and its other end connected to the slidable rear ring 21.

Slidably and removably mounted on the grooved shank 16 is a bait holder which is designated generally by reference character 23. The bait holder 23 comprises an elongated plate 24 of substantially semi-circular cross section (see Figure 4) comprising inturned longitudinal marginal side flanges 25 which are operable in the grooves 18 for slidably securing said plate 24 on the shank 16. Extending rearwardly from the plate 24 is an integral, resilient bar or latch 26 which terminates in an enlarged, roughened rear end portion providing a handle or finger-piece 27. The rear end portion of the shank 16 has formed transversely therein a groove or notch 28 for the reception of a keeper 29 on the resilient bar 26 for releasably securing the bait holder 23 against longitudinal movement on said shank. This is shown to advantage in Figure 5 of the drawing. Rearwardly of the notch 28 the shank 16 is tapped, as at 30, to receive a stop screw 31 (see Figure 6) for positively securing the holder 23 against accidental removal and possible loss in the event the detent 29 should become disengaged from the notch 28. Mounted on the forward end portion of the plate 24 is a forwardly projecting hook or prong 32 which is engageable beneath one of the gills of a minnow, as indicated at 33, for mounting said minnow on the holder 23 with its head projecting forwardly through the ring 7.

Rising from the upper portion of the stationary front ring 7 is an eye 34 having secured thereto a float 35. Also mounted on the upper portion of the ring 7 is a resilient guide 36 for the fishing line, as indicated at 37. The line 37 is connected by a bridle 38 to the spring 8 at the juncture 11 of the legs 10 of the wings 9 of said spring.

It is thought that the use of the device will be readily apparent from a consideration of the foregoing.

Briefly, the shanks 12 and 16 are squeezed together to permit the ring 21 to be disengaged from the notches 14 and 19. The ring 21 is then slid forwardly on the shanks 12 and 16, thus collapsing the flexible foraminous tube 22. The minnow 33 is then mounted on the holder 23 through the medium of the hook or prong 32. The substantially segmental plate 24 is then mounted on the shank 16 and slid forwardly, the flanges 25 travelling in the grooves 18 until arrested by engagement with the closed forward ends of said grooves. At this point the detent 29 snaps into the notch 28 for automatically securing the holder 23 in position with the head of the minnow projecting forwardly through the ring 7. The stop screw 31 is then inserted for further securing the assembly. The ring 21 is then slid rearwardly on the shanks 12 and 16 and snaps into the notches 14 and 19. Thus, the foraminous tube 22 is opened or extended for substantially enclosing and protecting the minnow. The floats 15 and 35 maintain the device with the minnow therein in an upright position in an obvious manner. The construction and arrangement is such that the minnow is free to move in substantially all directions and swim about in the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A live bait guard comprising: a ring, a pair of shanks secured at one end to said ring and having notches therein, hooks on the other ends of said shanks, a flexible, foraminous, collapsible tube having one end connected to the ring, and a ring connected to the other end of the tube and slidable on the shanks, the second named ring being engageable in the notches for retention thereby for securing the tube in open position.

2. A minnow holder comprising: a ring, a pair of spaced, parallel shanks secured at one end to said ring, a flexible, foraminous, collapsible tube having one end connected to said ring, a slidable ring operable on the shanks and connected to the other end of the tube for securing the same in open position, said shanks having notches therein for the reception of the slidable ring for releasably securing the same in operative position, and means for mounting the minnow longitudinally in the tube.

3. A minnow holder comprising: a ring, a pair of spaced, parallel shanks secured at one end to said ring, a flexible, foraminous, collapsible tube having one end connected to said ring, a slidable ring operable on the shanks and connected to the other end of the tube for securing same in open position, said shanks having notches therein for the reception of the slidable ring for releasably securing the same in operative position, and means for mounting the minnow longitudinally in the tube, said means including a holder comprising a plate of substantially semi-circular cross-section slidably and removably mounted on one of the shanks, and an impaling prong for the minnow on said plate.

4. A minnow holder comprising: a plurality of spaced, parallel shanks, one of said shanks having longitudinal grooves and a notch therein, a plurality of spaced, opposed rings on the shanks, a foraminous tube mounted on the rings and encircling the shanks, hooks on one end of the shanks, and means for mounting a minnow in the tube, said means including an elongated, removable plate mounted longitudinally on said one shank and including inturned flanges slidably engaged in the grooves, a resilient latch on one end of the plate engageable in the notch, and an impaling prong for the minnow on the other end portion of said plate.

References Cited in the file of this patent

UNITED STATES PATENTS

| | | |
|---|---|---|
| 533,652 | Kittle | Feb. 5, 1895 |
| 856,867 | Hayward | June 11, 1907 |
| 862,150 | Fredricks | Aug. 6, 1907 |
| 2,359,410 | Edwards | Oct. 3, 1944 |